United States Patent
Chang et al.

(10) Patent No.: US 7,480,332 B2
(45) Date of Patent: Jan. 20, 2009

(54) BIT RATE CONTROL METHOD AND APPARATUS FOR MPEG-4 VIDEO CODING

(75) Inventors: Seung-gi Chang, Seoul (KR); Zhiming Zhang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 853 days.

(21) Appl. No.: 10/667,970

(22) Filed: Sep. 23, 2003

(65) Prior Publication Data

US 2004/0146103 A1 Jul. 29, 2004

(30) Foreign Application Priority Data

Jan. 23, 2003 (KR) .................. 10-2003-0004508

(51) Int. Cl.
*H04N 7/12* (2006.01)
*G06K 9/36* (2006.01)

(52) U.S. Cl. .................. 375/240.03; 382/251
(58) Field of Classification Search .......... 375/240.03, 375/240.08, 240.06; 348/419.1; 725/95, 725/126; 382/251, 253; *H04N 7/12; G06K 9/36*
See application file for complete search history.

(56) References Cited

U.S. PATENT DOCUMENTS

| | | | | |
|---|---|---|---|---|
| 5,909,513 | A * | 6/1999 | Liang et al. | 382/253 |
| 5,969,764 | A * | 10/1999 | Sun et al. | 375/240.06 |
| 6,167,162 | A * | 12/2000 | Jacquin et al. | 382/251 |
| 6,542,545 | B1 * | 4/2003 | Vetro et al. | 375/240.08 |
| 2002/0010938 | A1 * | 1/2002 | Zhang et al. | 725/95 |
| 2003/0007558 | A1 * | 1/2003 | Vetro et al. | 375/240.03 |
| 2005/0155080 | A1 * | 7/2005 | Zhang et al. | 725/126 |

OTHER PUBLICATIONS

A New SOLPH-Based Rate Control Algorithm for MPEG Video Coding Neural Netowrks for Signal Processing XII. Sep. 3-Sep. 5, 2002, Swiss, pp. 577-586.
Rate Control Algorithm Using SOFM-Based Nwural Classifier Gwang Hoon Park and Yoon Jin Lee Jun. 8, 2000 vol. 36 No. 12.

* cited by examiner

*Primary Examiner*—Gims S Philippe
(74) *Attorney, Agent, or Firm*—Sughrue Mion, PLLC

(57) ABSTRACT

A bit rate control method and apparatus for MPEG-4 video coding are provided. The method includes performing initialization in which a video frame is inputted and a memory is allocated to a rate distortion (RD) buffer where an encoded bitstream to be transmitted to a decoder is stored; intra-coding the inputted video frame; updating the RD buffer; performing post-frame skip in which whether or not the next frame should be encoded is determined to avoid underflow or overflow of the RD buffer; receiving the next video frame, and estimating a quantization parameter (QP) or inter-coding the next video frame depending on whether or not the inputted frame is a first video object plane (VOP); performing a back propagation (BP) model update based on the number of the inputted frames after inter-coding the next frame, or performing the post-frame skip again after performing the self-organizing control; and receiving the next video frame, and estimating QPs of all the frames or performing the self-organizing control in all the frames.

11 Claims, 6 Drawing Sheets

BIT RATE CONTROL METHOD AND APPARATUS FOR MPEG-4 VIDEO CODING

This application claims the priority of Korean Patent Application No. 2003-04508 filed on Jan. 23, 2003, in the Korean Intellectual Property Office, the disclosure of which is incorporated herein in its entirety by reference.

BACKGROUND OF THE INVENTION

1. Field of the Invention

The present invention relates to MPEG-4 video coding, and more particularly, to a bit rate control method and apparatus for MPEG-4 video coding.

2. Description of the Related Art

Moving picture experts group (MPEG) has proposed a method of compressing moving pictures by which temporal redundancy and spatial redundancy are removed. The temporal redundancy is removed using a motion compensation method and the spatial redundancy is removed by applying discrete cosine transform (DCT) to still frames.

MPEG-4 is an object-based technique of compressing moving pictures according to MPEG compression standards. Unlike conventional techniques, MPEG-4 enables individual coding of an object having an arbitrary shape.

FIG. 1 shows a hierarchy of MPEG-4. A video session (VS) 110 denotes the entire sequence of an image. The VS 110 comprises one or more video objects (VO) 120. For example, when a person exists in the middle of background, only the person's sequential motions can be described using a single VO, or a background sequence can be separately described. Each VO 120 comprises one or more video object layers (VOL) 130. The VOL 130 gives each VO 120 spatial and temporal resolution.

The lowermost video object plane (VOP) 150 refers to instant data corresponding to the resolution of each VO. Also, a new class, a group of VOP (GOV) 140, exists between the VOL 130 and VOP 150 to perform random access. If the group of VOP 140 exists, coding starts from a mode in which temporal-directional estimation is not performed.

Most MPEG-4 systems encode raw video data into a variable bit rate (VBR) bit stream using fixed bit quantization. In this case, if data traffic of an outputted bitstream varies suddenly, an output buffer is very likely to overflow or underflow. When raw video data is encoded into a constant bit rate (CBR) bitstream, data traffic is maintained at a constant level irrespective of the kinds of inputted images by flexibly adjusting bit quantization.

The rate control methods can be categorized as frame-based rate control methods, in which outputted data traffic is controlled in frame units, or macro-block-based rate control methods, in which outputted data traffic is controlled in macro-block units. The macro-block-based rate control method enables more accurate control of bit rates, but requires more complicated and difficult techniques than the frame-based method. Accordingly, the frame-based rate control method is typically used.

In real-time video communications, video encoding requires accurate rate control. The accurate rate control should meet the end-to-end delay condition and also should enable estimation of rate distortion (RD) function of a video encoder such that a buffer used for encoding does not overflow or underflow. If traffic of data stored in a buffer is too high, an encoder decreases a delay of the buffer and skips an encoding frame to avoid overflow of the buffer. Once the encoding frame is skipped due to the overflow, motions of decoded images become unnatural due to discontinuity of encoded video sequence.

When the frame-based video is encoded, a suitable quantizer should be selected considering a limit of the bit used in quantization. This point is important for organizing a suitable and adaptive rate distortion model.

On the other hand, an adaptive rate distortion model is based on a self-organizing learning Petri net (SOLPN). A Petri net is a useful mathematical tool for modeling various events or actions. Petri nets were first developed in 1962 by Carl Petri in West Germany. The Petri net comprises two types of nodes, i.e., places and transitions, which can be coupled to a different type of node by an arc. Here, the transition is a function for generating an output signal corresponding to an input signal, and the place is a space for storing any input/output signal. A learning Petri net (LPN) is obtained by adding a learning ability, such as provided by a neural network, to the Petri net.

FIG. 2 shows a basic learning structure of an LPN. Each transition, excluding input transition, comprises a predetermined number of input places and a predetermined number of output places. For simplicity, different transitions do not share the same input or output places. Although a limited number of transitions or places are shown in FIG. 2, more transitions or places may be coupled to each other in parallel or in series, building different shapes.

The foregoing LPN has the learning and reproducing abilities of a neural network. However, unlike neutral networks, the LPN has the characteristics of a distribution function. Parameters of the LPN are pre-set based on a user's experience, like in the case of normal neural networks. In the LPN, since the numbers of transitions and places between an input layer and an output layer and connections thereof are pre-fixed according to the user's experience, output values are quite incorrect. For this reason, the SOLPN was proposed.

The SOLPN is a self-organizing LPN in which the learning rate is high and accurate modeling is enabled since learning is performed not in a system based on the user's experience but in a system based on training samples.

The DCT-based video encoder uses various rate distortion (RD) models. One of the RD models encodes respective image blocks and intelligently selects the best parameter. However, a method of using this RD model is not suitable for real-time encoding due to complicated calculations.

In another method, a quantizer is selected based on a predetermined mathematical model and a control parameter is estimated from RD data of a coding system. Although this method is suitable for real-time encoding, frame skips occur frequently and channel bandwidth is wasted during a low-delay application service. Also, to obtain a high coding efficiency, more complex RD algorithms are needed, and even more experiments are required to obtain suitable control parameters.

A self-organized map based on a rate control scheme was disclosed in "Rate Control Algorithm Using SOFM-based Neural Network," Electronics Letter, vol. 36, No. 12, pp. 1041-1158, 2000. This map organizes a frame-based global RD model using a neural classifier. The disclosed map may lead to good results, but requires off-line training. That is, to collect all modifications capable of being generated from image characteristics using a plurality of video samples, a fixed quantization parameter (QP), which is varied from 1 to 31, should be used. However, this method is not suitable for on-line control and cannot easily update the configurations or the structures of corresponding neural networks.

SUMMARY OF THE INVENTION

The present invention provides a bit rate control method and apparatus using a SOLPN, by which dynamic properties of a video can be obtained and a suitable quantizer can be adaptively obtained during video coding.

In accordance with a first exemplary aspect of the present invention, there is provided a bit rate control method comprising performing initialization in which a video frame is inputted and a memory is allocated to a rate distortion (RD) buffer where an encoded bitstream to be transmitted to a decoder is stored; intra-coding the inputted video frame; updating the RD buffer; performing post-frame skip in which whether or not the next frame should be encoded is determined to avoid underflow or overflow of the RD buffer; receiving the next video frame, and estimating a quantization parameter (QP) or inter-coding the next video frame depending on whether or not the inputted frame is a first video object plane (VOP); performing back propagation model update based on the number of the inputted frames after inter-coding the next video frame, or performing the post-frame skip again after performing the self-organizing control; and receiving the next video frame, and estimating the QPs of all the frames or performing the self-organizing control of all the frames.

In accordance with another exemplary aspect of the present invention, there is provided a bit rate control apparatus comprising a pre-encoding unit for receiving a video stream and initializing a buffer required for coding; an encoding unit for inter-coding and intra-coding the received video stream; a post-encoding unit for updating the buffer based on the coded video data and adjusting the bit rate by controlling frame-skip; a time instant update unit for receiving the next frame; and a determination unit for determining whether or not the received frame is a first video object plane (VOP).

In accordance with yet another exemplary aspect of the present invention, there is provided a computer-readable medium having embodied thereon a computer program for executing the foregoing method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
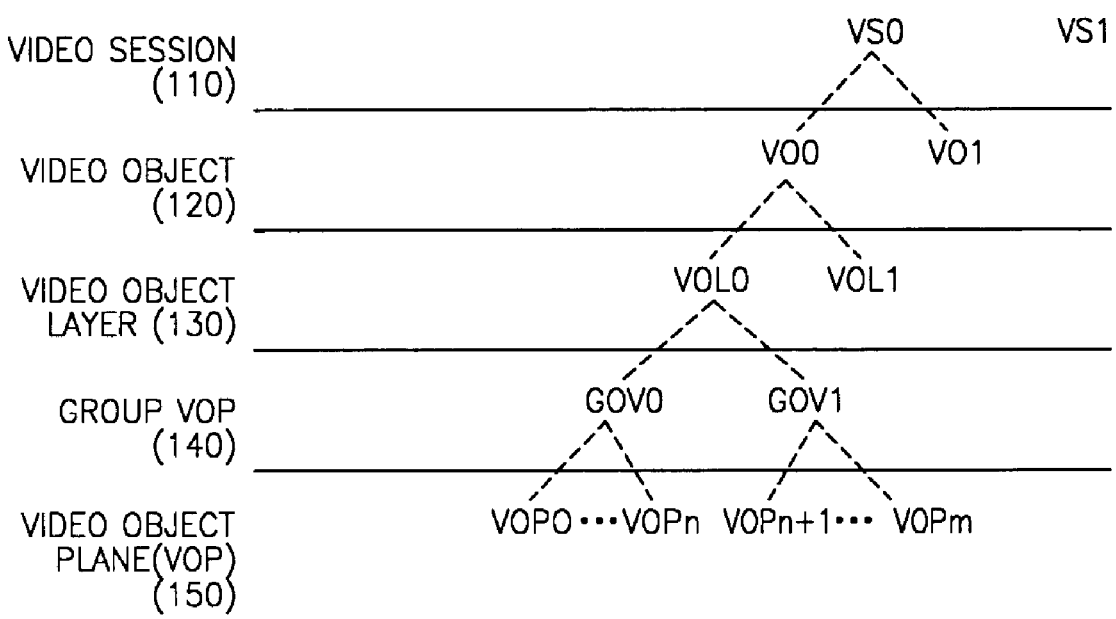
FIG. 1 shows a hierarchy of MPEG-4.
Figure 2:
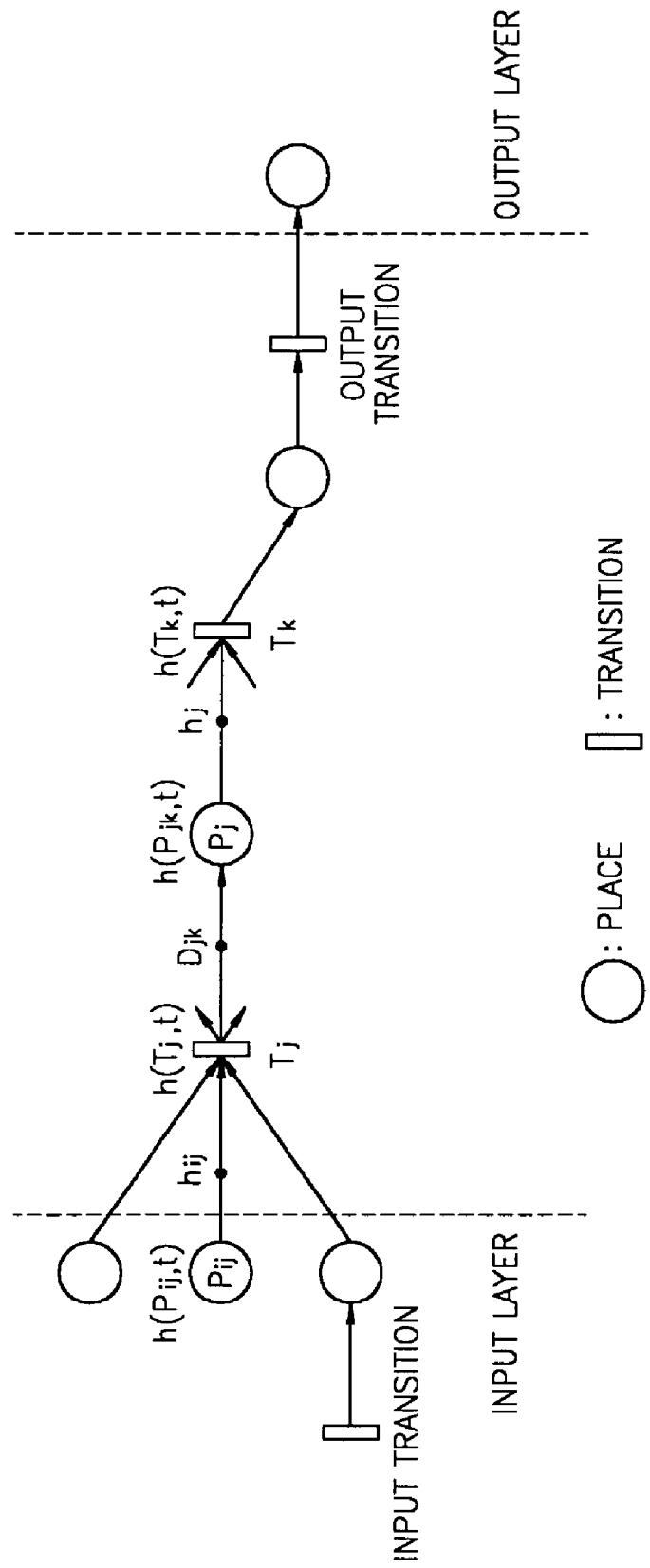
FIG. 2 shows a basic learning structure of an LPN.

The structure and operation of a bit rate control apparatus according to the present invention and a method therefor will be described more fully with reference to the accompanying drawings, in which illustrative, non-limiting embodiments of the invention are shown. The same reference numerals in different drawings represent the same element.

Figure 3:
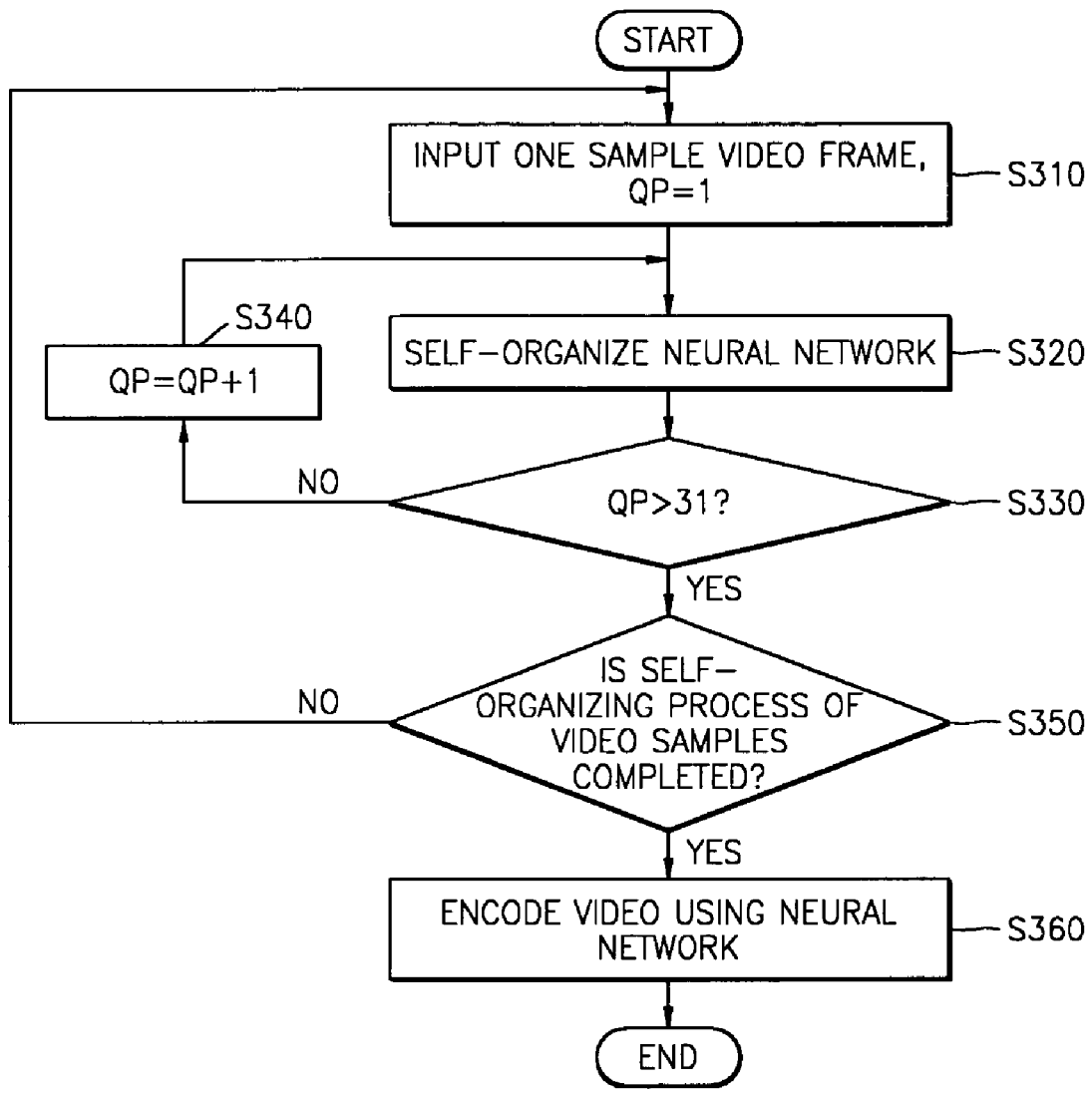
FIG. 3 is a flowchart illustrating a method of self-organizing a rate distortion (RD) model using a standard self-organizing mapping (SOM) algorithm.

FIG. 3 is a flowchart illustrating a method of self-organizing an RD model using a standard self-organizing mapping (SOM) algorithm.

The standard SOM algorithm is a traditional algorithm used in a purge logic, which can find unique similarity and self-organize a network using training samples.

One sample video frame is firstly inputted and the inputted video frame is encoded using a pre-set quantization parameter (QP) (S310). After that, a system is self-organized using the standard SOM algorithm (S320). The self-organizing process will be described in detail with reference to FIG. 4.

Figure 4:
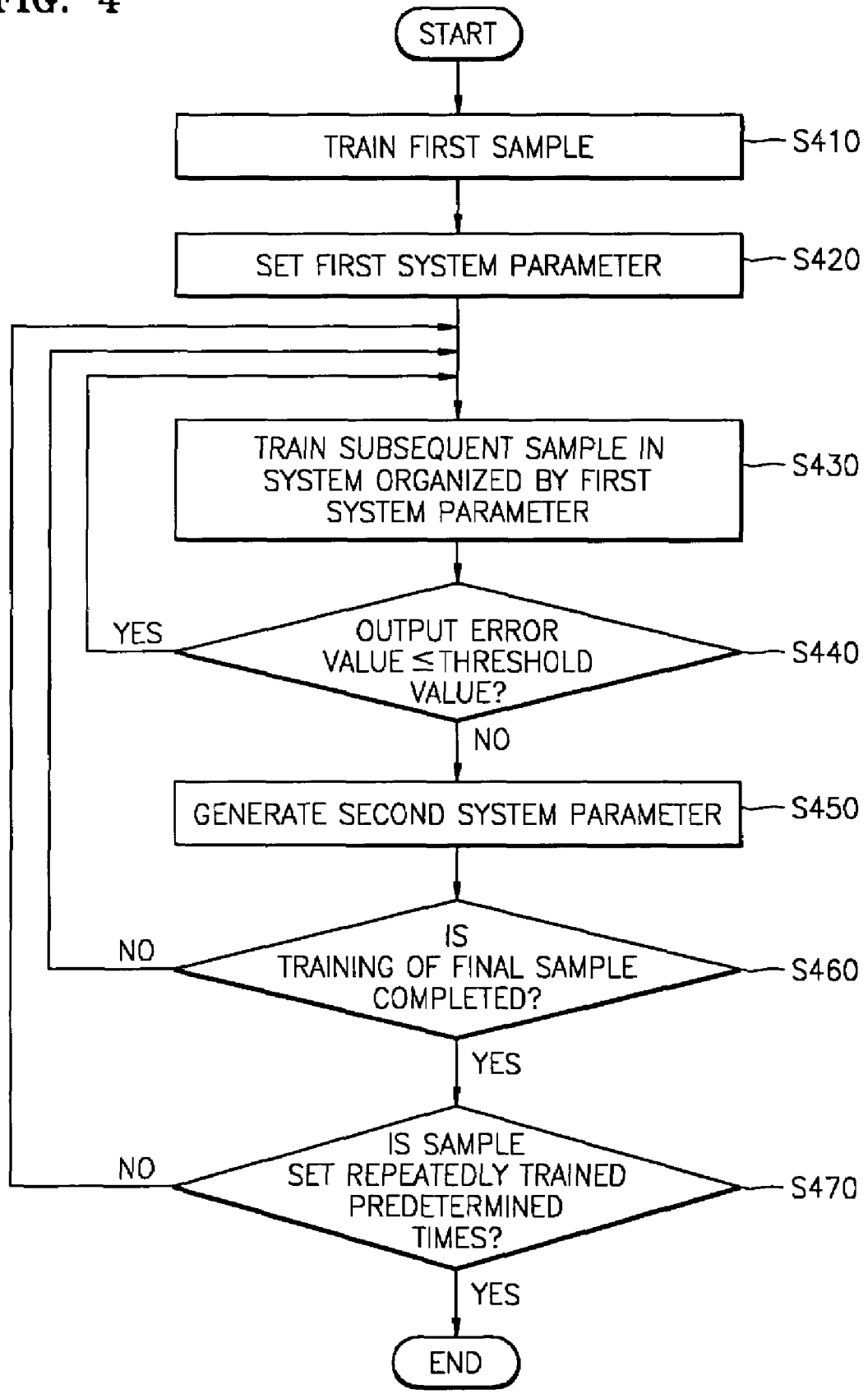
FIG. 4 is a flowchart illustrating a process of self-organizing a system using a basic structure of an SOLPN.

FIG. 4 is a flowchart illustrating the process of self-organizing a system using a basic structure of an SOLPN.

To organize the system, training is sequentially performed using a sample set having pre-known input values and output values (S410). That is, a first system parameter is set by training a first sample (S420), and a second sample is trained in the system organized by the first system parameter (S430). An error value between the output value obtained by training the second sample and the pre-known output value of the training sample is calculated and compared with the threshold value (S440). Here, if it is determined that the error value is equal to or less than a predetermined threshold value, a third sample is sequentially trained in the system. If it is determined that the error value is more than the predetermined threshold value, a second system parameter, corresponding to the second sample, is generated and added to the existing first system parameter (S450).

Afterwards, subsequent samples are sequentially inputted and trained in the system. Then, output values obtained by training are compared with the pre-known output values of the training samples. Next, based on the error value, a new system parameter is generated or a subsequent sample is trained in the system organized by the pre-determined system parameter. Finally, it is determined whether or not the training of the final sample is completed (S460). Thus, the system self-organizing process is completed by repeating sequential training of samples a predetermined number of times (S470).

After performing the foregoing self-organizing process, it is determined whether or not the quantization parameter QP>31 (S330). If it is determined that QP≦31, the QP is increased by 1 (S340). If it is determined that QP>31, the foregoing steps are repeatedly performed using multiple video samples (S350).

Then, a video is encoded using the neural network, which is organized in the foregoing steps (S360). First I frame and P frame are firstly encoded using a user-predefined quantizer. Next, the RD buffer is updated, or post-frame skip control for controlling whether or not a frame to be processed is skipped is performed.

The QP is estimated using the neural network, and after the present image frame is encoded, buffer control is performed. That is, if 80% of the buffer is filled, as described in the standard VM18.0, the next frame is skipped. Afterwards, the next frame is inputted and encoded, or the process is finished.

In the foregoing method, a plurality of video samples and too many units are required for training a neural network several times. Further, the structure of a network, which is self-organized during processing or encoding of the video, cannot be easily modified.

The conventional method, in which a neural network is previously trained, takes too much time and makes it difficult to select sample videos. Thus, in the present invention, a method of self-organizing a neural network when bitstream is encoded is provided. Therefore, the time for previously training the neural network is not required. Also, since an encoder organizes a network model on its own, properties of bitstream can be adaptively obtained.

The basic concept of the present invention is as follows. Before n video frames are encoded, an RD model is self-organized using an SOLPN algorithm. After the self-organizing process is finished, the foregoing self-organized network is used to estimate a quantizer. After that, the structure of the network is dynamically modified based on an estimation error.

Figure 5:
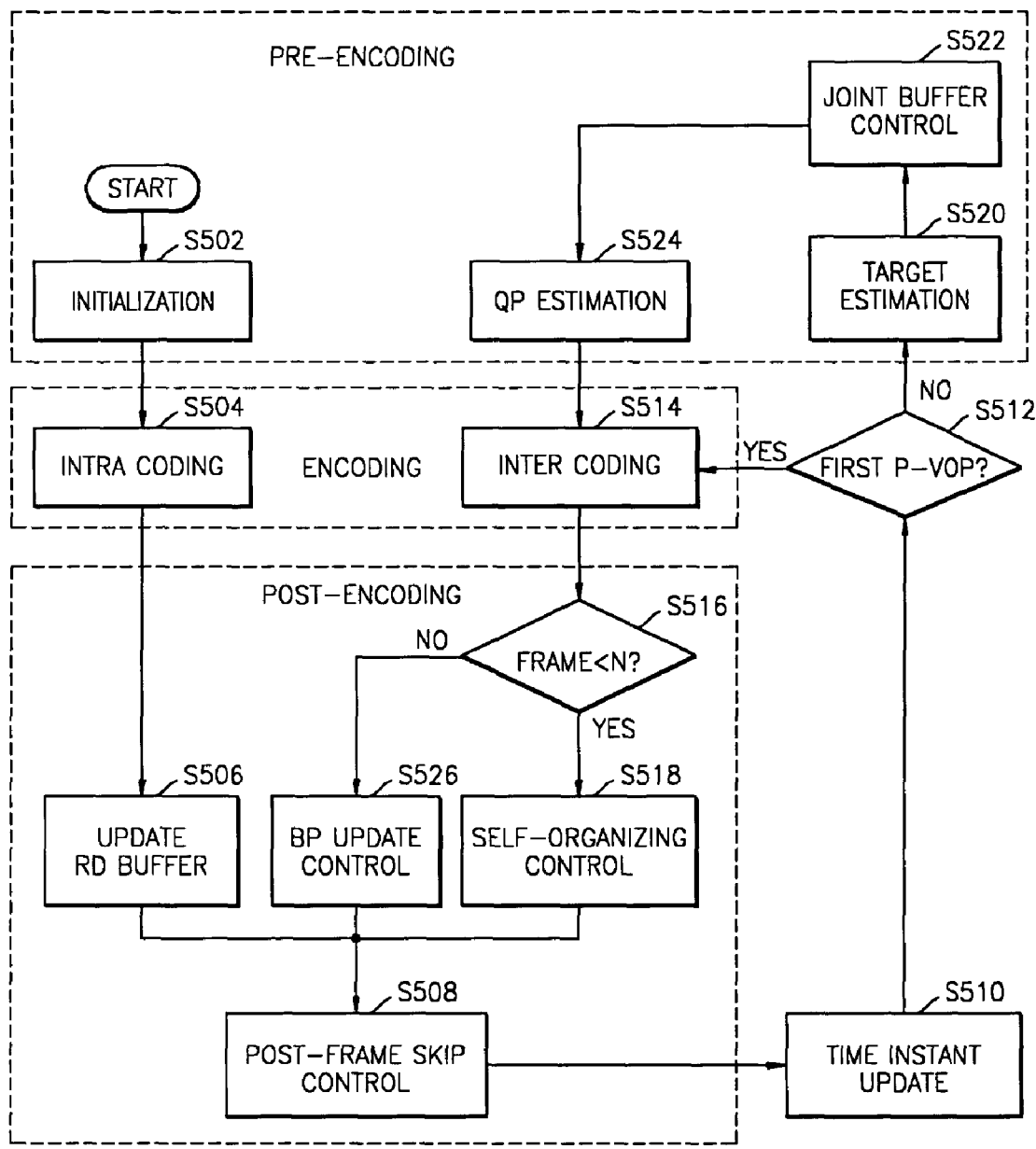
FIG. 5 is a detailed flowchart illustrating a method of controlling the bit rate according to the present invention.

FIG. 5 is a detailed flowchart illustrating a method of controlling a bit rate according to the present invention. The method of controlling the bit rate will be described in detail for a case where video frames are sequentially inputted.

(1) Initialization step is performed (S502). A memory is allocated to an RD buffer.

(2) Intra coding is performed (S504). The intra coding, including DCT, quantization, and variable length coding (VLC), is performed for frame 0.

(3) The RD buffer is updated (S506). The RD buffer is a buffer in which an encoded bitstream to be transmitted to a decoder is stored.

(4) Post-frame skip is performed (S508). To avoid underflow or overflow of the RD buffer based on the encoded bitstream, it is determined whether or not the next frame is encoded.

(5) Time instant update is performed (S510). The next frame is selected and inputted.

(6) It is determined that whether or not the inputted frame is a first video object plane (VOP) (S512). If it is determined that the inputted frame is the first VOP, inter coding is performed. If it is determined that the inputted frame is not the first VOP, target estimation is performed. Supposing that the inputted frame is the first VOP in the present description, the inter coding is performed.

(7) Inter coding is performed (S514). The inter coding, including DCT, quantization, and VLC, is performed for selected frame 1.

(8) It is determined whether or not the number of inputted frames is less than a pre-set constant N (S516). If it is determined that the number of inputted frames is less than N, self-organizing control is performed. If it is determined that the number of inputted frames is equal to or more than N, back propagation (BP) model update control is performed. In the present description, the frame 1 is being processed. Thus, since 2 (i.e., less than N) frames are processed, the self-organizing control is performed.

(9) Self-organizing control is performed (S519). The self-organizing control is a process of organizing a neural network and updating the RD buffer based on the coding result.

(10) Post-frame skip is performed (S508).

(11) Time instant update is performed (S510). Based on the result of S508, the next frame i to be encoded is selected.

(12) Because the presently inputted frame is not the first VOP, the target estimation is performed (S520). That is, according to a state of the RD buffer, the number of bits to be allocated to the frame i is estimated.

(13) Joint buffer control is performed (S522). The RD buffer is modified in consideration of the structure of the network and the target estimation result.

(14) A quantization parameter (QP) is estimated using the self-organized network (S524). That is, a QP to be used for encoding is estimated based on the organized network. The estimation process is as follows. Input vector is firstly positioned at an input layer. Next, prediction output is obtained from the organized network. Then, target output is predicted such that error remains less than QP ±2. To guarantee constant image quality, the QP difference between adjacent frames is limited below ±2. After that, a winner is found. That is, an appropriate QP whose target bit allocation is the closest to the prediction output is found. The selected QP is allocated to the quantizer.

(15) Inter coding is performed (S514).

(16) Since the presently inputted frame also is less than N (S516), the self-organizing step is performed.

(17) Self-organizing step is performed (S518). The self-organizing process of the network continues based on encoded bitstream.

(18) Post-frame skip is performed (S508).

(19) Time instant updating is performed (S510). The next frame is inputted and the foregoing steps 12 through 19 are repeated until the number of inputted frames is more than N.

(20) Target estimation is performed (S520).

(21) Joint buffer control is performed (S522).

(22) QP is estimated using the organized network (S524).

(23) Inter coding is performed (S514).

(24) If it is determined that the number of inputted frames is equal to or more than N (S516), BP model update control is performed (S526). Based on generated bits, BP adjusts the neural network. The neural network is adaptively updated and the entire number of neurons is maintained. Further, based on output error, the structure of the neural network or parameters are modified as described later. Owing to the nature of video sequence, it is not easy to predict output values with accuracy, in particular, when a scene change is serious.

To solve this problem, the update scheme of the network is divided into two categories. If the prediction output, which is performed using the network, is close to the actual output, parameters of the network will be updated. If the error exceeds a threshold, the present input record overwrites a node of the network and obtains the closest output. In other words, the size of the network is not varied and only the fuzzy base structure is varied. The foregoing update scheme can appropriately adjust the size of the network and find out variation of picture characteristics.

(25) Post-frame skip is performed (S508).

(26) Time instant update is performed (S510).

(27) The foregoing steps are repeated until all the frames finish the steps.

Figure 6:
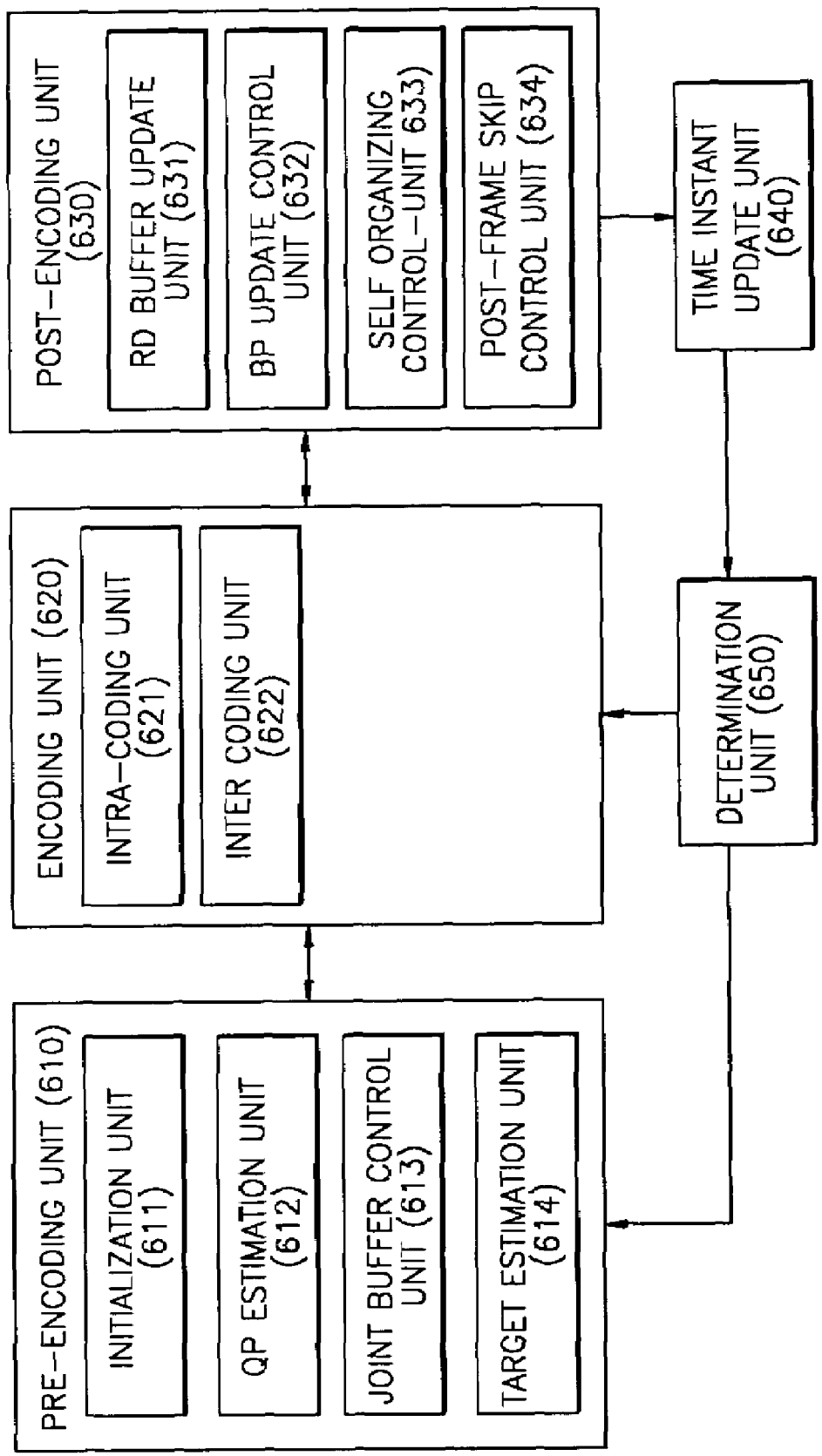
FIG. 6 is a block diagram of a bit rate control apparatus according to the present invention.

FIG. 6 is a block diagram of a bit rate control apparatus according to the present invention.

The bit rate control apparatus of the present invention comprises a pre-encoding unit 610, an encoding unit 620, a post-encoding unit 630, a time instant update unit 640, and a determination unit 650.

The pre-encoding unit 610 undergoes several steps required before an inputted video frame is coded and comprises an initialization unit 611, a QP estimation unit 612, a joint buffer control unit 613, and a target estimation unit 614.

The initialization unit 611 allocates a memory to an RD buffer. The QP estimation unit 612 estimates a QP using an organized network. That is, based on the organized network, the QP to be used for encoding is estimated. The joint buffer control unit 613 modifies the RD buffer in consideration of the structure of the network and the target estimation result. The target estimation unit 614 estimates the number of bits to be allocated to frame i according to a state of the RD buffer.

The encoding unit 620 comprises an intra coding unit 621 and an inter coding unit 622, which perform intra coding and inter coding, respectively.

The post-encoding unit 630 comprises an RD buffer update unit 631, a BP update control unit 632, a self-organizing control unit 633, and a post-frame skip control unit 634.

The RD buffer is a buffer in which an encoded bitstream to be transmitted to a decoder is stored, and the RD buffer update unit 631 updates the RD buffer. The BP update control unit 632 performs BP model update control. The self-organizing control unit 633 organizes the network and updates the RD buffer based on the coding result. The post-frame skip control unit 634 determines whether or not the next frame is encoded to avoid underflow or overflow of the RD buffer based on the encoded bitstream.

The time instant update unit 640 receives the next frame.

The determination unit 650 determines whether or not the inputted frame is a first video object plane (VOP).

This invention may be embodied in a general purpose digital computer by running a program from a computer readable medium, including but not limited to storage media such as magnetic storage media (e.g., ROMs, floppy discs, hard discs, etc.); and optically readable media (e.g., CD-ROMs, DVDs, etc.). The computer readable recording medium can be dispersively installed in a computer system connected to a network, and stored and executed as a computer readable code in a distributed computing environment.

As described above, according to the present invention, since a rate distortion (RD) model can be self-organized, a plurality of samples, a plurality of quantizers, or previous trainings are not required. Thus, the time for controlling a bit rate can be markedly reduced. Also, as the RD model is self-organized when the bitstream is encoded, characteristics of encoded bitstream can be easily found and the RD model is adaptive to the inputted bitstream. As a result, the RD model is not affected by sample video training.

Further, in the present invention, when the frame based bitstream is encoded, the peak signal to noise ratio (PSNR) is good and frame skips are reduced as compared to a standard method described in VM18.0.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bit rate control method comprising:
   (a) performing initialization in which a video frame is inputted and a memory is allocated to a rate distortion buffer where an encoded bitstream to be transmitted to a decoder is stored;
   (b) intra-coding the inputted video frame;
   (c) updating the rate distortion buffer;
   (d) performing post-frame skip in which whether or not a next video frame should be encoded is determined to avoid underflow or overflow of the rate distortion buffer;
   (e) receiving the next video frame, and estimating a quantization parameter if the received video frame is not a first video object plane, and inter-coding the received video frame if the received video frame is a first video object plane;
   (f) performing one of a back propagation model update and a self-organizing control based on the number of the inputted video frames after inter-coding the next video frame, and then performing the post-frame skip again; and
   (g) receiving the next video frame and estimating quantization parameters of all the video frames or performing the self-organizing control in all the video frames.

2. The method of claim 1, wherein step (e) comprises:
   (e1) receiving the next video frame;
   (e2) determining whether or not the received video frame is a first video object plane;
   (e3) if it is determined that the received video frame is the first video object plane, performing inter-coding; and
   (e4) if it is determined that the received video frame is not the first video object plane, performing target estimation for estimating a number of bits to be allocated to the received video frame according to a state of the rate distortion buffer, performing joint buffer control for modifying the rate distortion buffer in consideration of a structure of the network and the target estimation result, and estimating a quantization parameter based on the result.

3. The method of claim 2, wherein estimating the quantization parameter in step (e4) comprises:
   (e4a) positioning an input vector at an input layer;
   (e4b) obtaining a prediction output from the network organized by the self-organizing control;
   (e4c) predicting a quantization parameter from the prediction output such that an error remains within a predetermined range; and
   (e4d) allocating the predicted quantization parameter to a quantizer.

4. The method of claim 3, wherein step (e4c) comprises:
   (e4c1) selecting the quantization parameter such that a quantization parameter difference between adjacent frames is limited to less than ±2; and
   (e4c2) finding an appropriate quantization parameter that is the closest to the prediction output.

5. The method of claim 1, wherein step (f) comprises:
   (f1) determining whether or not the number of inputted video frames is less than a pre-set constant;
   (f2) if it is determined that the number of the inputted video frames is less than the pre-set constant, performing the self-organizing control for organizing a network and updating the rate distortion buffer; and
   (f3) if it is determined that the number of the inputted video frames is equal to or more than the pre-set constant, performing the back propagation model update.

6. A bit rate control apparatus comprising:
   a pre-encoding unit for receiving a video stream and initializing a buffer required for coding;
   an encoding unit for inter-coding and intra-coding the received video stream;
   a post-encoding unit for updating the buffer based on the coded video data and adjusting a bit rate by controlling frame-skip;
   a time instant update unit for receiving a next frame; and
   a determination unit for determining whether or not the received frame is a first video object plane;
   wherein the post-encoding unit comprises:
   a rate distortion update unit for updating the rate distortion buffer in which an encoded bitstream to be transmitted to the decoder is stored;
   a back propagation update control unit for performing back propagation model update control;
   a self-organizing control unit for organizing a network and updating the rate distortion buffer based on the coding result; and
   a post-frame skip control unit for determining whether or not the next frame is encoded to avoid underflow or overflow of the rate distortion buffer based on the encoded bitstream.

7. A computer-readable medium having embodied thereon a computer program for executing a bit rate control method comprising:

(a) performing initialization in which a video frame is inputted and a memory is allocated to a rate distortion buffer where an encoded bitstream to be transmitted to a decoder is stored;
(b) intra-coding the inputted video frame;
(c) updating the rate distortion buffer;
(d) performing post-frame skip in which whether or not a next video frame should be encoded is determined to avoid underflow or overflow of the rate distortion buffer;
(e) receiving the next video frame, and estimating a quantization parameter if the received video frame is not a first video object plane, and inter-coding the received video frame if the received video frame is a first video object plane;
(f) performing one of a back propagation model update and a self-organizing control based on the number of the inputted video frames after inter-coding the next video frame, and then performing the post-frame skip again; and
(g) receiving the next video frame and estimating quantization parameters of all the video frames or performing the self-organizing control in all the video frames.

8. The computer-readable medium of claim 7, wherein step (e) comprises:
(e1) receiving the next video frame;
(e2) determining whether or not the received video frame is a first video object plane;
(e3) if it is determined that the received video frame is the first video object plane, performing inter-coding; and
(e4) if it is determined that the received video frame is not the first video object plane, performing target estimation for estimating a number of bits to be allocated to the received video frame according to a state of the rate distortion buffer, performing joint buffer control for modifying the rate distortion buffer in consideration of a structure of the network and the target estimation result, and estimating a quantization parameter based on the result.

9. The computer-readable medium of claim 8, wherein estimating the quantization parameter in step (e4) comprises:
(e4a) positioning an input vector at an input layer;
(e4b) obtaining a prediction output from the network organized by the self-organizing control
(e4c) predicting a quantization parameter from the prediction output such that an error remains within a predetermined range; and
(e4d) allocating the predicted quantization parameter to a quantizer.

10. The computer-readable medium of claim 9, wherein step (e4c) comprises:
(e4c1) selecting the quantization parameter such that a quantization parameter difference between adjacent frames is limited to less than ±2; and
(e4c2) finding an appropriate quantization parameter that is the closest to the prediction output.

11. The computer-readable medium of claim 7, wherein step (f) comprises:
(f1) determining whether or not the number of inputted video frames is less than a pre-set constant;
(f2) if it is determined that the number of the inputted video frames is less than the pre-set constant, performing the self-organizing control for organizing a network and updating the rate distortion buffer; and
(f3) if it is determined that the number of the inputted video frames is equal to or more than the pre-set constant, performing the back propagation model update.

\* \* \* \* \*